United States Patent
Cubizolles

(10) Patent No.: US 8,727,615 B2
(45) Date of Patent: May 20, 2014

(54) METHOD OF MEASURING THE INTERNAL SURFACE TEMPERATURE OF A PIPE AND ASSOCIATED DEVICE

(75) Inventor: Geraud Cubizolles, Grenoble (FR)

(73) Assignee: Commissariat à l'énergies alternatives, Paris (FR)

( * ) Notice: Subject to any disclaimer, the term of this patent is extended or adjusted under 35 U.S.C. 154(b) by 233 days.

(21) Appl. No.: 12/742,935

(22) PCT Filed: Nov. 20, 2008

(86) PCT No.: PCT/EP2008/065941
§ 371 (c)(1),
(2), (4) Date: May 14, 2010

(87) PCT Pub. No.: WO2009/065908
PCT Pub. Date: May 28, 2009

(65) Prior Publication Data
US 2010/0290502 A1    Nov. 18, 2010

(30) Foreign Application Priority Data
Nov. 23, 2007 (FR) ...................................... 07 59267

(51) Int. Cl.
*G01K 13/00* (2006.01)
*G01K 1/00* (2006.01)
*G01K 7/00* (2006.01)

(52) U.S. Cl.
USPC ............................ 374/148; 374/208; 374/166

(58) Field of Classification Search
CPC ...... A61B 5/7285; A61B 8/00; A61B 8/4455; A61B 8/4472; A61B 8/56; A61B 8/565
USPC .................................. 374/147, 148, 208, 166
See application file for complete search history.

(56) References Cited

U.S. PATENT DOCUMENTS

| | | | |
|---|---|---|---|
| 4,671,675 A | | 6/1987 | Arisi et al. |
| 5,423,610 A | * | 6/1995 | Stansfeld et al. ............. 374/179 |
| 5,792,070 A | * | 8/1998 | Kauphusman et al. ....... 600/549 |
| 6,536,949 B1 | * | 3/2003 | Heuser .......................... 374/179 |
| 7,004,911 B1 | * | 2/2006 | Tu et al. ......................... 600/549 |
| 2001/0053882 A1 | * | 12/2001 | Haddock et al. .............. 600/549 |

(Continued)

FOREIGN PATENT DOCUMENTS

FR    2 514 896 A    4/1983

OTHER PUBLICATIONS

R.A. Fortman, et al., "Heat Transfer Studies With Candu Fuel Simulators", 5$^{th}$ International Conference on Nuclear Engineering, ICONE 5, XP008094298, May 26-30, 1997, pp. 1-7.

*Primary Examiner* — Mirellys Jagan
(74) *Attorney, Agent, or Firm* — Oblon, Spivak, McClelland, Maier & Neustadt, L.L.P.

(57) ABSTRACT

A method of and associated device for measuring temperature of an internal surface of a pipe, including: a) at least one temperature-sensitive element that is moved away from a probe, radially with respect to the fore-and-aft axis of the pipe, so as to bring the temperature-sensitive element(s) into contact against the internal surface of the pipe, b) wherein the contact force applied between the sensitive element(s) of the probe and the internal surface is increased until the contact force reaches a defined value at any point on the surface.

10 Claims, 3 Drawing Sheets

(56) References Cited

U.S. PATENT DOCUMENTS

| | | | |
|---|---|---|---|
| 2002/0048310 A1* | 4/2002 | Heuser | 374/141 |
| 2002/0067754 A1* | 6/2002 | Werneth | 374/179 |
| 2002/0071474 A1* | 6/2002 | Werneth | 374/179 |
| 2002/0123696 A1* | 9/2002 | Kokate et al. | 600/549 |
| 2003/0139685 A1* | 7/2003 | Kaufman et al. | 600/549 |
| 2004/0176699 A1* | 9/2004 | Walker et al. | 600/549 |
| 2007/0106173 A1* | 5/2007 | Korotko et al. | 600/549 |
| 2008/0045855 A1* | 2/2008 | Mooney et al. | 600/549 |

* cited by examiner

METHOD OF MEASURING THE INTERNAL SURFACE TEMPERATURE OF A PIPE AND ASSOCIATED DEVICE

TECHNICAL FIELD AND PRIOR ART

The invention relates to a novel method of measuring the internal surface temperature of a pipe and an associated device.

The novel method makes it possible to measure the temperature on the internal surface of a pipe by controlling the contact pressure between the sensitive elements and said surface. Thus, thanks to the method according to the invention, and depending on the envisaged cases, it is possible to access the temperature field discretised in space (case of a stationary test) if the probe according to the invention is displaced, or the kinetic of evolution of the temperature on the number of point(s) corresponding to the number of sensitive area(s) present on the probe according to the invention.

Obtaining the temperature field on the internal surface of a pipe constitutes information of importance in experimental thermo-hydraulic studies. Indeed, its precise knowledge leads to the refined estimation of the exchange coefficient, the detection of regions of change of phase (condensation, vaporisation), the localisation of altered or modified thermal transfer area. However, obtaining a surface temperature measurement in a confined medium, such as the internal surface of a pipe, is particularly difficult and the experimenter often has to be restricted to partial and set information.

At present, information on the temperature is obtained by means of moving probes with thermocouples pinned against the internal pipe wall by a spring. The force exerted consequently varies with the measurement position.

From the publication entitled "Heat Transfer Studies With Candu Fuels Simulators" published under the number 2428, at the conference held during the "5th International Conference on Nuclear Engineering ICONE5" which took place from the 26 to the 30 May 1997, is known a probe comprising temperature-sensitive elements, made of Inconel®, in the form of claddings. The natural flexibility of these sensitive elements enables them to act as springs and thus, each to be in contact with the internal pipe surface, the temperature of which it is aimed to determine. However, this probe does not make it possible to control the contact force between the sensitive elements and the internal surface of the pipe, since it depends uniquely on the natural flexibility of the sensitive elements.

Which is why one aim of the present invention is to reduce and standardise the uncertainty due to the difference in contact resistance over the whole of the measurement surface.

Another aim of the invention is to reduce the wear of the contact area of sensitive element(s) of a probe used for the measurement during displacements inside a same pipe and thus to extend the lifetime of the probe.

DESCRIPTION OF THE INVENTION

To that end, the invention concerns a method of measuring the temperature of the internal surface of a pipe of a fore-and-aft axis (XX'), wherein the following steps are carried out:

a) at least one temperature-sensitive element is moved away from a probe, radially with respect to the axis (XX'), so as to bring the temperature-sensitive element(s) into contact against the internal surface of the pipe, b) the contact force applied between the sensitive element(s) of the probe and the internal surface is increased until it reaches a defined value at any point on said surface, the contact force being constant and reproducible, whatever the point of the internal surface S on which it is aimed to carry out a temperature measurement.

"Temperature sensitive element(s)" of a probe is herein and within the scope of the invention taken to mean the part(s) of the probe of which the constituent material has a property variable with temperature (electrical resistance, electromotive force, etc.) to which it (they) is (are) subjected through contact.

Thus it may involve part(s) of a platinum resistance thermometer, a thermistor constituted of a semi-conductor material, thermocouples, etc.

According to the invention, one (several) miniaturised thermometer(s) is (are) displaced on the surface to be measured. These thermometer(s) (thermocouple(s), platinum resistance probe(s), thermistor(s)) is (are) made integral by a probe and connected to the internal surface of the pipe either directly, or by a specific contact element, the thermal inertia of which is limited, while controlling the contact force and, consequently, the thermal contact resistance. The material employed to manufacture this contact element must have a thermal conductivity as high as possible in order to reduce the temperature stabilisation time of the probe. In the case of probes used under electrical potential, the material must moreover be electrically insulating. Preferably, it may be diamond. It may also be aluminium nitride or boron nitride.

The possibility of displacing the measurement instrument makes it possible to capture more complete and/or better localised information. The control of the contact force leads to the attenuation of the thermal contact resistance and, consequently, the reduction of the measurement uncertainty. The elimination of the contact against the pipe measured during the displacement cancels the effects of friction on the wear of the contact elements and the pipe, limiting, as a result, the evolution over time of the thermal resistance and the alteration of the measurement surface.

According to the invention, the contact pressure of the sensitive element(s) is controlled on the cylinder, the temperature field of which is measured. The invention may be adapted to any diameter of pipe, to any condition of temperature accessible to measurement by thermocouple, platinum resistance probe or thermistor, by adapting the materials chosen to form the frame of the probe.

The principal gain concerns the reproducibility of the temperature measurements from one point to another of the surface by standardising the contact resistance, on the one hand, and over time, on the other hand, thanks to the reduction in wear (the probe/wall contact being eliminated during phases of displacement inside the pipe).

Preferably, when the probe is displaced inside the pipe, the force applied by the sensitive element(s) against the internal surface of the pipe is relaxed. Advantageously, the relaxing of the applied force is such that no contact remains between the sensitive element(s) of the probe and the internal surface of the pipe.

The invention also relates to a device for measuring the temperature of the internal surface of a pipe of a fore-and-aft axis (XX'), comprising:

a probe comprising at least one temperature-sensitive element with a free end that extends parallel to the axis, means for moving away radially with respect to the axis the free end of the sensitive element(s), means for applying a defined force to the free end of the sensitive element(s) moved away radially, the contact force being constant and reproducible, whatever the point of the internal surface S on which it is aimed to carry out a temperature measurement.

According to a preferred embodiment, the device comprises a plurality of sensitive elements distant from each other and with, for each, their free end parallel to the axis.

The probe preferably comprises a hollow body and the sensitive elements are preferably in the form of a plurality of flexible metal wires. Each of these elements has one end fixed in the hollow body and the other end is free and curved towards the exterior.

According to an advantageous embodiment, the means of moving away the flexible metal wires and of application of defined force to their free end comprise:

a plate of width L, forming piston through which pass the wires, a bellows fixed to the piston and to the hollow body by forming with it a sealed enclosure adapted to be in communication with a pressurisation device, flexible splines, with for each, one end fixed to the hollow body so as to be distant from each other by a distance L, and a free end integral externally with the free end of a wire and internally with a stop. Thus, according to the invention, to carry out the measurement phases, the pressurisation device pressurises the sealed enclosure to a predefined pressure. This causes the axial displacement of the piston fixed to the bellows and thus, the concomitant radial moving away of the free ends of the splines and those of the wires up to a position corresponding to the abutment of the piston on the stop. Then, this brings about the increase of the forces applied to the piston that is transmitted to the free ends of the wires, through the intermediary of the stop and the exterior part of the splines, which is integral with it until the predefined pressure is attained.

Advantageously, the plate forming piston and the stop are of complementary tapered shapes.

According to an alternative, the device comprises a counterweight comprising a hollowing in which is lodged the free end of a sensitive element, the material of the counterweight ensuring the thermal continuity between a part in exterior contact with it and the sensitive element. The material of the counterweight further ensures preferably the electrical insulation between the part and the sensitive element.

The invention regards the use of a device described above for measuring the internal surface temperature of experimental installation pipes simulating by direct joule effect the release of power from nuclear fuel pencils. These experimental installation pipes, for example made of Inconel®, have the same dimensional characteristics as those of claddings of nuclear fuel pencils.

Generally speaking, all applications of thermometry in pipes of which the internal surface is accessible may be envisaged thanks to the invention.

BRIEF DESCRIPTION OF DRAWINGS

Other characteristics and advantages of the invention will become clearer on reading the detailed description made in reference to the following figures, in which.

DETAILED DESCRIPTION OF SPECIFIC EMBODIMENTS

Figure 1:
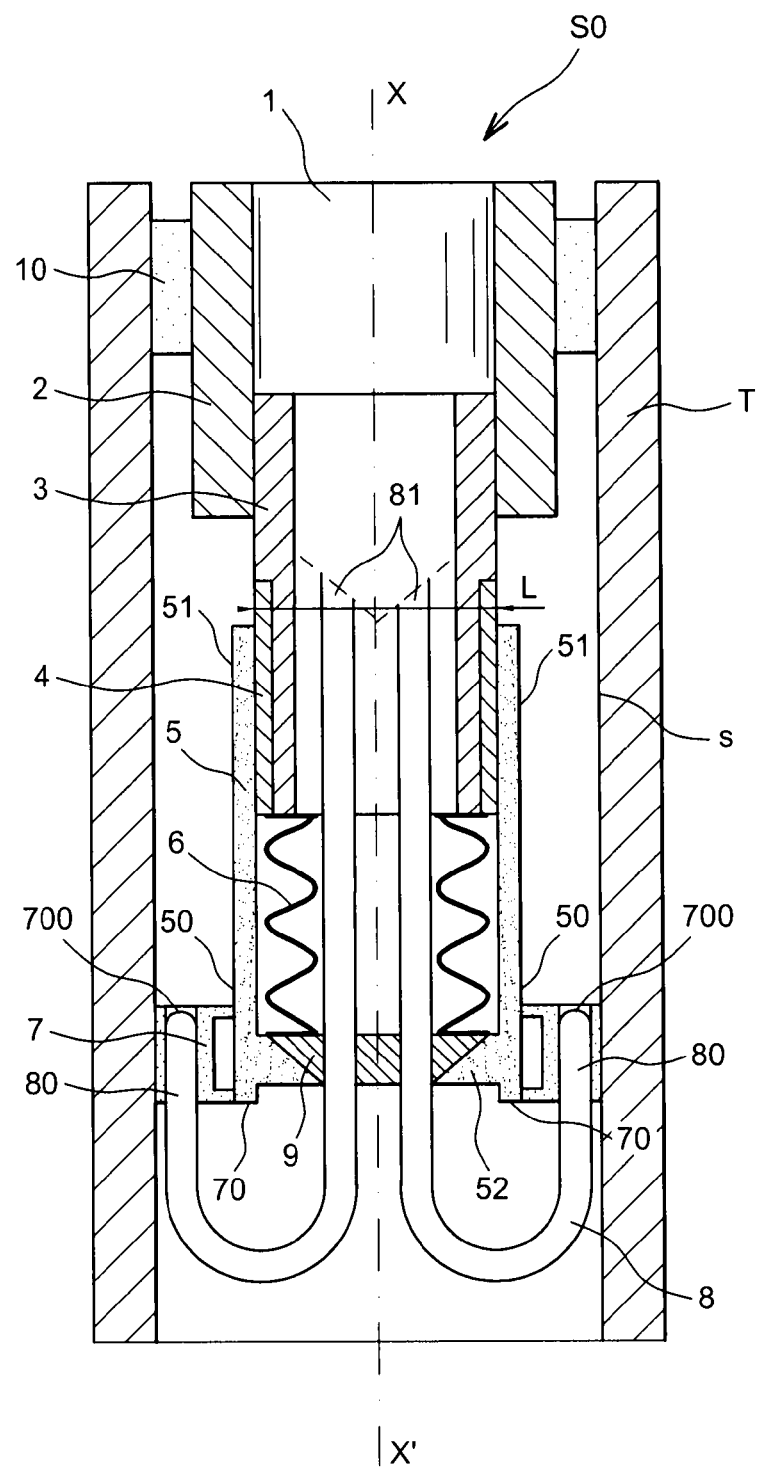
FIG. 1 is a schematic representation in longitudinal section of the probe part of an embodiment of the temperature measurement device according to the invention.

In FIG. 1 is represented, in longitudinal section, a probe So according to the invention introduced in vertical position into a pipe T and provided with three sensitive elements arranged at regular angular pitch of 120®. The pipe T represented is a nuclear fuel pencil simulator of a fore-and-aft axis XX': it may be heating or not.

The probe So comprises principally a hollow body 1, 2, 3, temperature sensitive elements 8 and a measuring head 4, 5, 6, 7, 9.

A thermally and/or electrically insulating ring 10 is provided in the embodiment illustrated. Said insulating ring 10 protects the body 1 from any contact with the internal surface S of the pipe T during its introduction and its displacement inside the latter. The function of the probe So is also to avoid a short circuit (if the pipe T is at an electrical potential), and to limit heat leakages from the pipe T to the probe So.

The hollow body 1 of the probe So is, in the embodiment illustrated, constituted of two parts, namely a main body 2 and a secondary body 3 in the form of a cylinder fixed in a sealed manner to the interior of the main body.

As illustrated, the main body 2 is a pipe that simultaneously ensures the functions of:

transmission of the movement from a displacement device, not represented, return guiding of the temperature sensitive elements 8 described hereafter, creation of a pressurisation volume inside the probe.

As illustrated, the secondary body 3 is a cylinder fixed in a sealed manner to the interior of the main body 2. Said secondary body 3 simultaneously ensures the functions of:

reducing the size of the main body 2 of probe So so as to fix the pinning splines 5 described hereafter, clearing a sufficient space to put in place a contact counterweight 7 described hereafter, putting in place a reference surface for the sealed fixation of a supporting bellows 6 described hereafter.

The hollow body 1 is connected in its lower part to the measuring head 4, 5, 6, 7, 9 described hereafter, and in its upper part to a pressurisation device, not represented.

Figure 2A:
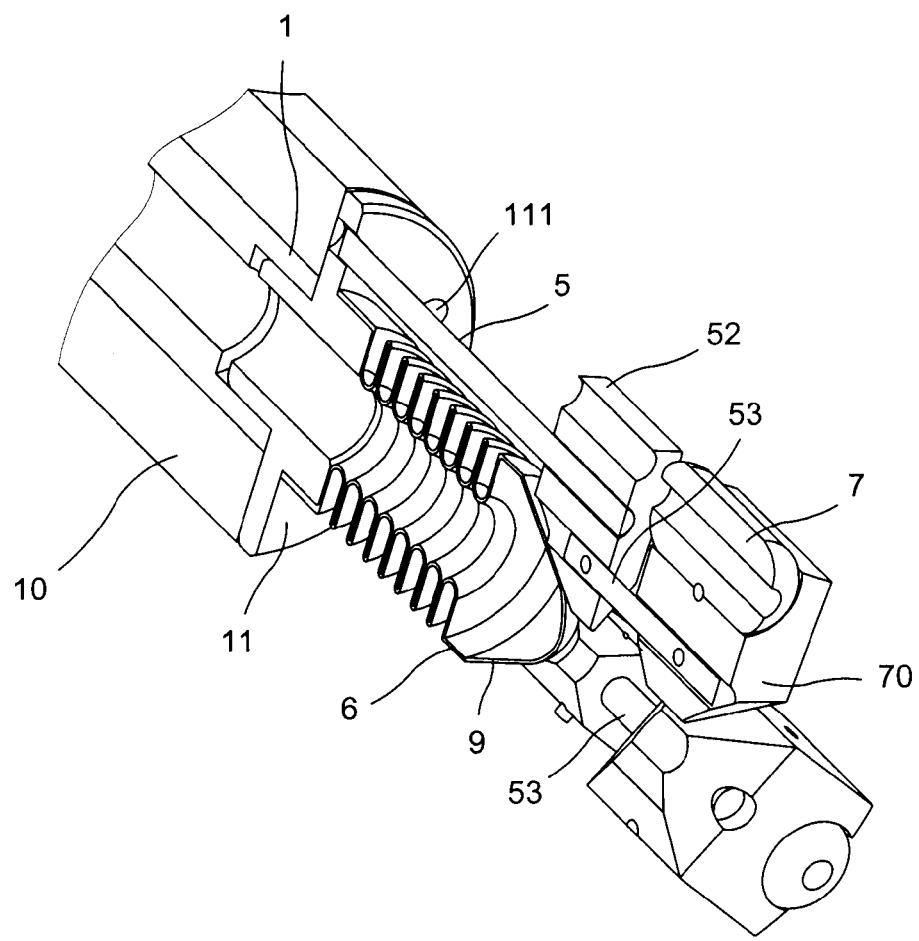
FIGS. 2A and 2B are respectively views in longitudinal section and in perspective of the probe part of an embodiment of the temperature measurement device according to the invention.
Figure 2B:
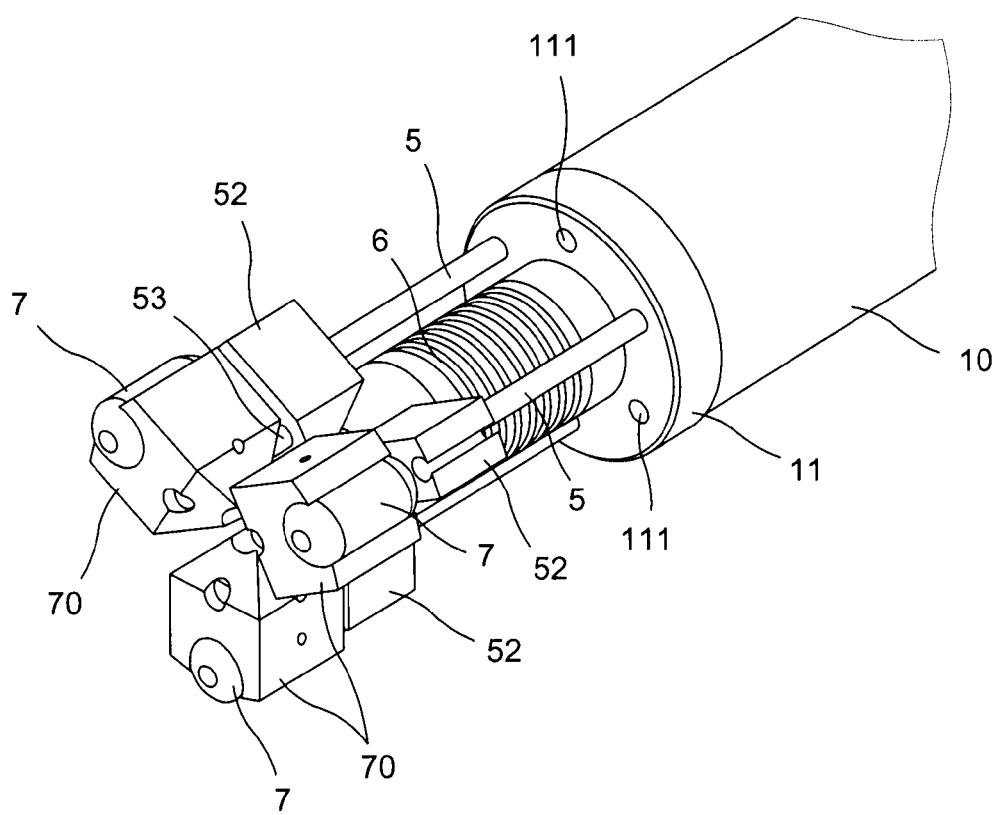

The part forming measuring head firstly comprises a positioning crown 4. As illustrated, the crown is a cylinder 4 fixed and centred on the secondary body 3. Pinning splines 5 are fixed on the crown 4. For each sensitive element 8, the position must be known with the best precision possible. Indeed, the targeted measurement is that of a temperature surface field, three measurements thus have to be controlled: the temperature, but also the axial position (in relation to a given reference on the instrumented pipe to be inspected) and the angular position (in relation to a specific generator of the instrumented pipe to be inspected). The positioning of the counterweights, by means of the pinning splines 5, is consequently a parameter of importance. The angular positioning is given by:

the external diameter of the ring 4 in the embodiment of FIG. 1, the holes 111 formed in the ring 11 in the embodiment of FIGS. 2A and 2B.

The pinning splines 5 are each constituted of an elastically deformable flexible strip fixed on the positioning crown 4. Their role is, on the one hand, to transmit the supporting force from the piston to the contact counterweight 7 during measurement phases, and, on the other hand, to bring back the contact counterweight to the central space of the pipe T during phases of displacement of the probe So without there being any contact between the exterior of the counterweights 7 and the interior of the pipe T. The splines 5 are distant from each other by an angle of 120° (FIG. 1 and FIGS. 2A and 2B).

As described hereafter, the transmission of the force is ensured by means of a stop 52 on which the piston 9 is bearing and a seat 70 of the contact counterweight 7.

The measuring head also comprises a bellows 6 that constitutes the deformable element of the sealed enclosure 5 formed by the hollow body 2, 3, and the piston 9 described hereafter. During measurement phases, said sealed enclosure is pressurised by a suitable pressurisation device with which it is in communication, as described hereafter. The pressurisation induces the displacement of the piston 9 and therefore the pinning force of the contact counterweights 7 on the pipe T.

The contact counterweights 7, already evoked, maintain the sensitive elements 8 of the probe in contact with the internal wall of the pipe T or pencil. The material of the counterweights 7 makes it possible to ensure the thermal continuity between the sensitive elements 8 of the probe and the pipe T. If necessary, the material of the counterweights 7 makes it possible to ensure the electrical insulation between these same elements 8 and T. The material of the counterweights is advantageously made of diamond. It may also be constituted of boron nitride or aluminium nitride.

As illustrated, each counterweight comprises a hollowing 700 in which is lodged the free end 80 of a sensitive element 8.

Each of the counterweights 7 represented has a cylindrical crown shape with an internal hollowing. This shape enables an identical surface contact whatever the point of the surface S at which it is aimed to measure the temperature. In the particular embodiments of FIG. 1 and FIGS. 2A and 2B, the axial thermal gradient is low (less than 10° C./m i.e. 0.01° C./mm), the formation of a cylindrical contact element (counterweight 7) makes it possible to increase the contact surface and, thus, to reduce the temperature stabilisation time of the counterweight 7 without significantly perturbing the measurement precision.

As evoked, the measuring head also comprises sensitive elements 8 distant from each other and each with a free end 80 that extends parallel to the longitudinal axis XX'. As illustrated, the sensitive elements 8 are in the form of a plurality of flexible metal wires with, for each, one end 81 fixed in the main hollow body 2 and one free end 80 curved towards the exterior.

The measuring head finally comprises the piston 9, which ensures the functions of:

transmission of force obtained on its upper face by the pressurisation of the internal part of the probe So to the contact counterweight 7 through the intermediary of the pinning splines 5 and their stop 52, continuity of the pressurised sealed enclosure. As illustrated, the piston 9 and the stop 52 are of complementary tapered shapes.

To carry out measurements, the operation of the probe So illustrated is the following. The sealed enclosure is pressurised by the pressurisation device to a predefined pressure. This causes the axial displacement of the piston 9 fixed to the bellows 6 and thus, the concomitant radial moving away of the free ends 50 of the splines 5 and those 80 of the wires 8 up to a position corresponding to the abutment of the piston 9 on the stop 52. Then, there is an increase in the forces applied to the piston 9, which is transmitted to the free ends 80 of the wires 8, through the intermediary of the stop 52 and the exterior part of the splines 5 which is integral with it, until the predefined pressure is reached (FIG. 1). The predefined pressure is calibrated beforehand as a function of the dimensions of the probe, the internal dimensions of the pipe, etc. Whatever the point at which it is aimed to measure the temperature T° along the pipe to be inspected, the predefined pressure is identical. Moreover, it is necessary to avoid having a pressure such that it generates a caulking between the surfaces in contact (counterweight 7/internal surface S in the figures).

The contact force thus applied between the contact counterweight 7 and the internal surface S of the pipe T is constant and controlled: it is directly proportional to the predefined pressure delivered by the pressurisation device in communication with the hollow body. Thus, whatever the point of the internal surface S on which it is aimed to carry out a temperature measurement, the contact force is constant and reproducible. In other words, according to the invention, the measurement uncertainty from one point to another of the surface S is reduced thanks to the control of the contact force, which leads to the attenuation of the thermal contact resistance.

During displacements of the probe So in the pipe T, the pressure in the sealed enclosure constituted by the hollow body 2, 3 and the mobile bellows 6/piston 9 assembly, is reduced, so that no contact remains between the counterweights 7 and the internal surface S. Furthermore, according to the invention, care is taken to ensure that the bringing closer together of the counterweights 7 is sufficient during the displacement of the probe So so as not to risk any contact through inadvertence with the surface S. The lifetime of the counterweights 7 and thus, of the probe So, is thus increased.

As represented in the embodiment of FIGS. 2A and 2B, the measuring head according to the invention comprises firstly a body 1, made preferably of stainless steel and in the form of a hollow cylinder. Its functions are essentially to ensure a guiding and a guard of the electrical potential.

Around the body 1 is arranged in a coaxial manner a ring 10, made preferably of alumina ceramic. At the end of the body 1 is fitted a ring 11 that ensures the blockage in translation of the ring 10. Said one-piece ring 11 replaces advantageously the two parts 3 and 4 of the embodiment of FIG. 1.

The bellows 6 is fitted on this ring 11. This fitting, as well as that of the ring 11 with the hollow body 1, is achieved in a sealed manner for example by a brazing technique. The sealing thereby obtained is that of the pressurisation chamber formed with the pressurisation device, the interior of the hollow body 1, that of the ring 11 and that of the bellows 6.

As shown in FIGS. 2A and 2B, the piston 9 forms an integral part of the bellows 6, which reduces the number of parts compared to the embodiment of FIG. 1. Furthermore, the passage of the sensitive elements (not represented in FIGS. 2A and 2B) is ensured by holes formed in the periphery of the ring 11 (see through holes 111) and ring 10 (the through holes opposite the holes 111 are not represented). Thus, compared to the embodiment of FIG. 1, there is no sealing to be formed between the sensitive elements and the piston 9 since the latter is not traversed by said elements.

In the embodiment of FIGS. 2A and 2B, the piston stops 52 or seats comprise an emerging hole 520 making it possible to perform an additional guiding of the sensitive elements over a part of their height. It goes without saying that according to this embodiment, no contact is possible between the internal surface S of the pipe to be inspected T and said stops 52. Furthermore, according to this embodiment, an additional linking part 53 is provided to link together the counterweight seat 70 and the stop 52. The material of this additional part 53 is judiciously chosen to avoid any thermal bridge between these two parts.

Other alternatives may be realised without however going beyond the scope of the invention. For instance, a device according to the invention may comprise the following characteristics, taken individually or in combination:

although illustrated with a plurality of sensitive elements 8 (two in number in sectional view), the probe according to the invention may comprise a single sensitive element 8, although illustrated in FIG. 1 in the form of two separate parts fixed together, according to the method of manufacture, the pinning splines 5/crown 4 assembly may be a one-piece part, depending on the nature, the dimensions and the materials constituting the probe So, the counterweights 7 may be omitted from the assembly, the nature of the sensitive elements 8 of the probe So may be variable (thermocouples, platinum resistance thermometers, thermistors, etc.).

The invention claimed is:

1. A device for measuring a temperature of an internal surface of a pipe of a fore-and-aft axis, comprising:
    a probe including a plurality of temperature-sensitive elements; and
    a pressurization device coupled to a piston configured to move the free end of the temperature-sensitive elements away radially with respect to the fore-and-aft axis;
    wherein said pressurization device and piston are configured to apply a defined contact force to the free end of the temperature-sensitive elements moved away radially, the contact force being constant and reproducible regardless of which point of the internal surface on which the contact force is aimed to measure the temperature,
    wherein the probe comprises a hollow body,
    wherein the temperature-sensitive elements are in a form of a plurality of flexible metal wires, and
    wherein each metal wire has a first end thereof fixed in the hollow body and a second end thereof that is free, the second end having a hook shape such that the second end is curved towards an exterior of the probe, and the hook-shaped second end terminating parallel to the fore-and-aft axis.

2. The device according to claim 1, wherein the piston is a plate of width L, through which pass the wires,
    wherein the pressurization device includes a bellows fixed to the piston and to the hollow body, which with the bellows form a sealed enclosure, and
    wherein the device further comprises flexible splines, each of which includes one end thereof fixed to the hollow body so as to be separated from each other by a distance L, and one free end thereof integral externally with the free end of one of the metal wires and internally with a stop.

3. The device according to claim 2, wherein the plate forming the piston and the stops have complementary tapered shapes.

4. The device according to claim 1, further comprising a counterweight including a hollowing in which is lodged the free end of the temperature-sensitive element, a material of the counterweight ensuring thermal continuity between a part in external contact with the counterweight and the temperature-sensitive element.

5. The device according to claim 4, wherein the material of the counterweight further ensures electrical insulation between the part and the temperature-sensitive element.

6. A method of measuring a temperature of an internal surface of a pipe of a fore-and-aft axis, comprising:
    providing a device according to claim 1;
    providing inside said pipe the probe of the device including the at least one temperature-sensitive element;
    moving away said at least one temperature-sensitive element radially with respect to the fore-and-aft axis via the pressurization device coupled to the piston, so as to bring the temperature-sensitive element(s) into contact against the internal surface of the pipe; and
    increasing contact force applied between the temperature-sensitive element(s) of the probe and the internal surface of the pipe until the contact force reaches a defined value at any point of the surface, the contact force being constant and reproducible, regardless of which point of the internal surface of the pipe on which the contact force is aimed to measure the temperature.

7. The method according to claim 6, further comprising measuring the temperature on the internal surface of pipes of experimental installation simulating by direct joule effect release of power from nuclear fuel pencils.

8. The method according to claim 6, wherein, when the probe is displaced inside the pipe, the force applied by the temperature-sensitive element(s) against the internal surface of the pipe is relaxed.

9. The method according to claim 8, wherein the relaxing of the force applied is such that no contact remains between the temperature-sensitive element(s) of the probe and the internal surface of the pipe.

10. A device for measuring a temperature of an internal surface of a pipe of a fore-and-aft axis, comprising:
    a probe including
        a plurality of temperature-sensitive elements distant from each other, each of the temperature-sensitive element(s) being flexible metal wires having a free end that extends parallel to the fore-and-aft axis of the pipe, and
        a hollow body;
    means for moving the free end of the temperature-sensitive element(s) away radially with respect to the fore-and-aft axis; and
    means for applying a defined contact force to the free end of the temperature-sensitive element(s) moved away radially, the contact force being constant and reproducible regardless of which point of the internal surface on which the contact force is aimed to measure the temperature,
    wherein the means for moving away the free end of the temperature-sensitive elements and the means of applying the defined contact force to the free end including
        a plate of width L, forming a piston,
        a bellows fixed to the piston and to the hollow body, which with the bellows form a sealed enclosure adapted to be in communication with a pressurization device, and
        flexible splines, each of which includes one end thereof fixed to the hollow body so as to be separated from each other by a distance L, and one free end thereof integral externally with the free end of one of the metal wires and internally with a stop.

* * * * *

UNITED STATES PATENT AND TRADEMARK OFFICE
CERTIFICATE OF CORRECTION

| | | |
|---|---|---|
| PATENT NO. | : 8,727,615 B2 | Page 1 of 1 |
| APPLICATION NO. | : 12/742935 | |
| DATED | : May 20, 2014 | |
| INVENTOR(S) | : Geraud Cubizolles | |

It is certified that error appears in the above-identified patent and that said Letters Patent is hereby corrected as shown below:

On the title page, Item (73), the Assignee's Information is incorrect. Item (73) should read:

--(73) Assignee: Commissariat á l'énergie atomique et aux énergies alternatives, Paris (FR)--

Signed and Sealed this
Twenty-sixth Day of August, 2014

Michelle K. Lee
*Deputy Director of the United States Patent and Trademark Office*